United States Patent [19]

Koike et al.

[11] 4,415,465

[45] Nov. 15, 1983

[54] HEAT-STORING COMPOSITION

[75] Inventors: Keiichi Koike, Matsudo; Michio Yanadori, Hachioji, both of Japan

[73] Assignees: Hitachi, Ltd.; Hitachi Plant Engineering and Construction Co., Ltd., both of Tokyo, Japan

[21] Appl. No.: 356,737

[22] Filed: Mar. 10, 1982

[30] Foreign Application Priority Data

Mar. 13, 1981 [JP] Japan .................................. 56-35193
Sep. 21, 1981 [JP] Japan .................................. 56-149267
Nov. 6, 1981 [JP] Japan .................................. 56-177221

[51] Int. Cl.³ .............................................. C09K 3/18
[52] U.S. Cl. ...................................... 252/70; 165/10; 165/104.17; 165/DIG. 4; 126/400
[58] Field of Search ............................................ 252/70

[56] References Cited

U.S. PATENT DOCUMENTS

| 2,108,261 | 2/1938 | Jamieson | 430/455 |
| 2,897,080 | 7/1959 | Teiser et al. | 430/458 |
| 3,867,151 | 2/1975 | Katz | 430/458 |
| 3,951,127 | 4/1976 | Watson et al. | 252/70 |

FOREIGN PATENT DOCUMENTS

| 50-90584 | 7/1975 | Japan . | |
| 55-142076 | 11/1980 | Japan | 252/70 |

Primary Examiner—John E. Kittle
Assistant Examiner—Robert A. Wax
Attorney, Agent, or Firm—Antonelli, Terry & Wands

[57] ABSTRACT

Supercooling of sodium thiosulfate pentahydrate is prevented by adding thereto naphtharene or naphthol and/or at least one of calcium sulfate, potassium chloride, sodium chloride, potassium bromide, sodium bromide, potassium iodide, and sodium iodide, or a pyridine.

10 Claims, 5 Drawing Figures

HEAT-STORING COMPOSITION

BACKGROUND OF THE INVENTION

The present invention relates to a heat-storing composition for a heat-storing means in air conditioning apparatus utilizing solar heat.

Air conditioning utilizing solar heat, etc. is carried out either by using water as a heat-storing material to utilize its sensible heat or by using a hydrated salt to utilize the latent heat of melting and solidification. An example of the hydrated salt is calcium chloride pentahydrate (melting point: 29.2° C.) for a heat pump. When the heat of lukewarm water from boilers, the waste heat from plants, etc. are to be stored, without using a heat pump, to utilize the heat in heaters in the air conditioning apparatuses, a heat-storing material having a melting point in a temperature range of 40°-50° C. is required. To this end, sodium thiosulfate pentahydrate ($Na_2S_2O_3.5H_2O$) is excellent owing to the melting point of 48.5° C., heat-storing capacity as high as 82 cal/cc, and low cost, but it has such disadvantages as occasioning of much supercooling at the solidification. That is, supercooling by 20°-30° C. takes place in a glass vessel, failing to release the stored heat at the desired temperature.

SUMMARY OF THE INVENTION

An object of the present invention is to provide a heat-storing composition capable of conducting heat-storing and heat release at a desired temperature while preventing supercooling of sodium thiosulfate pentahydrate.

The present invention provides a heat-storing composition which comprises sodium thiosulfate pentahydrate as the major component and naphthalene or naphthol as a nucleating agent, and further containing at least one of calcium sulfate, potassium chloride, sodium chloride, potassium bromide, sodium bromide, potassium bromide, and sodium iodide.

DETAILED DESCRIPTION OF THE INVENTION

Figure 1:
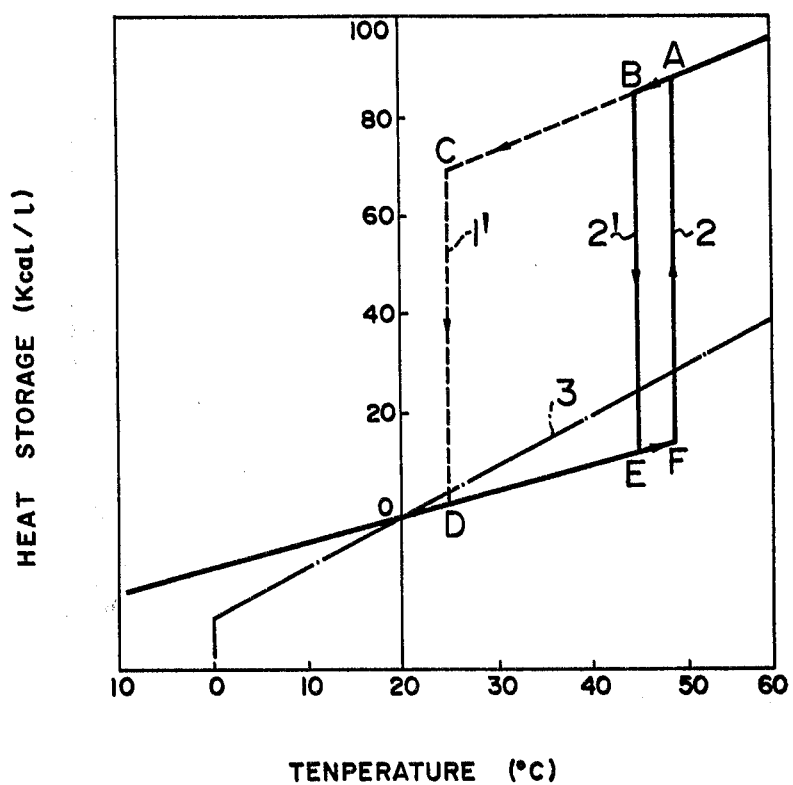
FIG. 1 is a diagram showing relations of heat-storing and heat release between the present heat-storing composition containing sodium thiosulfate pentahydrate and a nucleating agent, and single sodium thiosulfate pentahydrate or water as a heat-storing material.

Generally, the phase change from a liquid phase to a solid phase consists of a stage of generating crystal nuclei (nucleation) and a stage of crystal growth. It is known that the nucleation requires much energy and a supercooling phenomenon appears due to the presence of a barrier to such energy. To prevent the supercooling, a nucleating agent is added to a solution. In that case, it is also known that the nucleating agent exists undissolved in the liquid phase and must have a small boundary energy with crystals newly formed on the boundary and the nuclei must have a size over a given critical radius range (the critical radius range is 1-100 $\mu$m).

It is further known that the crystal growth is liable to occur on crystal faces of low molecular density (the 100 and 110 faces for the cubic system).

As a result of experimental studies of nucleating agent for sodium thiosulfate on the foregoing theoretical basis, the present inventors have found that naphthalene and naphthol have a remarkable nucleating action, as compared with other substances. It has been also found that calcium sulfate and halides such as sodium chloride, potassium chloride, potassium bromide, potassium iodide, etc. are effective as the nucleating agent. Nucleating action of these substances seems to be based on the following fact.

Naphthalene and naphthol have a low solubility in water (for example, 0.04 g of naphthalene is soluble in 100 g of water, and 0.01 g or less of naphthalene is soluble in 100 g of sodium thiosulfate pentahydrate), and thus can exist as nuclei in water. Furthermore, sodium thiosulfate pentahydrate, naphthalene and naphthol are in the same crystal form (monoclinic system), and it seems that crystals of sodium thiosulfate pentahydrate are liable to grow on the naphthalene or naphthol owing to the boundary energy.

Crystals of calcium sulfate ($CaSO_4.2H_2O$) belong to the monoclinic system and have a low solubility in sodium thiosulfate pentahydrate, and it seems that crystals of sodium thiosulfate pentahydrate are likewise liable to grow on its boundary.

Crystals of alkali metal halides such as sodium chloride, potassium chloride, etc. belong to other crystal form, that is, cubic system, but have such a factor that the 100 and 110 faces of the crystals serve as the starting point for crystal growth. It seems that the alkali metal halides can serve as a nucleating agent for sodium thiosulfate pentahydrate on this ground.

Addition of a very small amount of these nucleating agents is effective, and a practically effective amount thereof is 0.01% by weight or more on the basis of sodium thiosulfate pentahydrate. There is no upper limit to the amount thereof from the viewpoint of their action and effect, but addition of a large amount thereof reduces a heat-storing density. Thus, a practical upper limit is about 10% by weight on the basis of sodium thiosulfate pentahydrate.

Among these nucleating agents, calcium sulfate can be added in any form of hydrate having water of crystallization and anhydride. These nucleating agents can be added directly to sodium thiosulfate pentahydrate or, if necessary, can be supported on an appropriate support or carrier, and then the resulting support or carrier is added to sodium thiosulfate pentahydrate.

Furthermore, supercooling phenomenon is such a phenomenon that temperature is lowered below the freezing point wihout precipitating a solid, and when a solid is a hydrated salt, an aqueous supersaturated solution can be formed by supercooling. It has been found that formation of an aqueous supersaturated solution can be prevented by adding a water-soluble organic compound, which is insoluble in the salts, to water, and the supercooling can be prevented thereby. That is, when a melt of sodium thiosulfate pentahydrate is regarded as a kind of aqueous saturated solution, precipitation of crystals can be promoted by adding an alcohol or pyridine as an organic compound hardly insoluble in sodium thiosulfate pentahydrate but mutually soluble with water, and the supercooling can be prevented thereby.

Addition of a small amount of such an organic compound is effective for preventing supercooling, and a lower limit amount enough to cause satisfactory nucleation is about 1% by weight on the basis of sodium thiosulfate pentahydrate. There is particuarly no upper limit to the amount of the organic compound, but a practical upper limit amount is about 10% by weight on the basis of sodium thiosulfate pentahydrate, because addition of a large amount of the organic compound reduces the proportion of the heat-storing material and consequently the heat-storing capacity.

It is obvious from FIG. 1 that the single sodium thiosulfate pentahydrate, when melted above 48.5° C. and then cooled, coagulates not at 48.5° C., but, for example, at 25° C. due to supercooling, releasing the heat at 25° C., as shown by dotted line 1' (CD) to take a heat hysterisis loop as shown by ACDFA. On the other hand, the present heat-storing composition, that is, sodium thiosulfate pentahydrate containing 0.1% by weight of naphthalene, when melted and cooled, coagulates at 45° C., as shown by full line 2' (BE) to take a heat hysterisis loop of heat absorption and heat release, as shown by ABEFA. In FIG. 1, the arrow mark shows the changing direction of heat storage, where lines 1' and 2' represent heat release and 2 represents heat absorption.

The heat-storing capacity per unit volume of sodium thiosulfate pentahydrate is about 82 kcal/l at 48.5° C.; whereas the heat-storing capacity of water at the same temperature as shown by curve 3 is about 10 kcal/l. It is obvious therefrom that sodium thiosulfate pentahydrate is distinguished as a heat-storing material.

Figure 2:
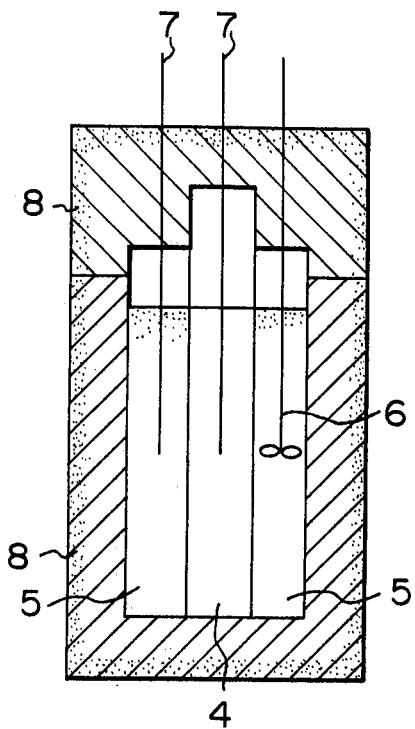
FIG. 2 is a schematic diagram showing a heat-storing simulator test apparatus.

In FIG. 2, numeral 4 is a heat-storing compartment filled with a heat-storing material, 5 a heat-exchanging water compartment, 6 a stirrer, 7 temperature sensors, and 8 a heat-insulating material.

Figure 3:
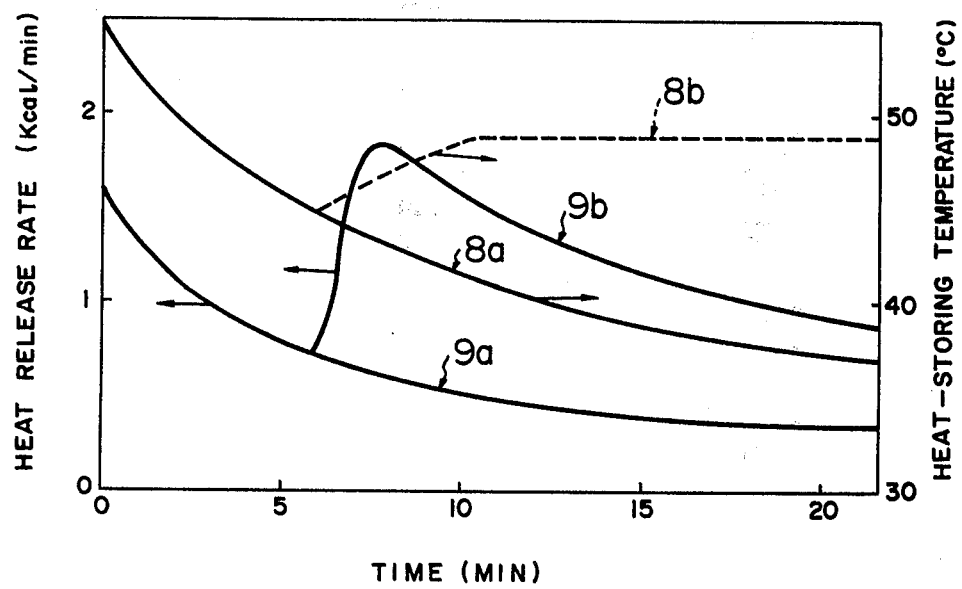
FIG. 3 is a diagram showing changes in temperature in a heat-exchanging water compartment in the test apparatus of FIG. 2.

In FIG. 3, changes in temperature with time in the heat-exchanging water compartment 2 are shown, where a volume ratio of the heat-storing compartment 4 to the heat-exchanging water compartment 5 is 1:5 in the apparatus of FIG. 2. The measuring conditions for FIG. 3 are that sodium thiosulfate pentahydrate is heated to 60° C. in the heat-storing compartment 4 in advance, and the heat-exchanging water compartment 5 is stirred at 20° C.

Curves $8a$ and $8b$ show changes in temperature in the heat-storing compartment with single sodium thiosulfate pentahydrate and that containing the nucleating agent, respectively. Curves $9a$ and $9b$ show heat release rates of the heat-storing compartment 4 with single sodium thiosulfate pentahydrate and that containing the nucleating agent, respectively, obtained from the changes in temperature of the heat-exchanging water compartment 5. As is obvious from curve $9b$, the present composition can produce a high heat release rate, and can effectively increase the heat-storing capacity for the heat exchanging in the range of 20°-60° C.

Figure 4:
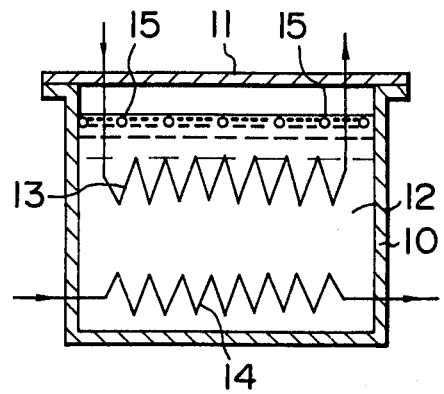
FIG. 4 is a schematic diagram showing a heat-storing simulator test apparatus.

In FIG. 4, a heat-storing simulator test apparatus for investigating the effect of naphthol is shown, where numeral 10 is a heat-storing apparatus, 11 a cover, 12 a heat-storing material (sodium thiosulfate pentahydrate), 13 a cooler, 14 a heater, and 15 a nucleating agent (naphthol).

Heat-storing material 12 is heated and all melted by passing a heating medium through the heater 14, and then the heat is withdrawn from the heat-storing material 12 by passing a cooling medium through the cooler 13.

Figure 5:
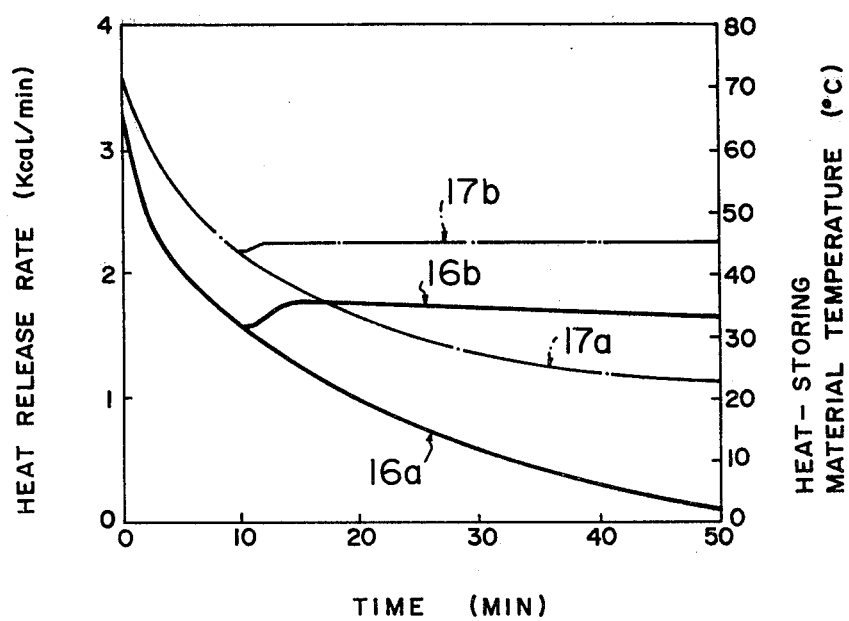
FIG. 5 is a diagram showing changes in temperature of heat-storing material in the test apparatus of FIG. 4.

In FIG. 5, changes with time in temperature of the heat-storing material 12 and heat release rate of the heat-storing material 12 to the cooler 13 are shown after the cooling medium has been passed through the cooler 13. The alternate long and short dash lines show changes in temperature, where line $17a$ is directed to the single sodium thiosulfate pentahydrate and line $17b$ to that containing the nucleating agent. In the case of the single heat-storing material, the temperature gradually lowers, whereas in the case of the heat-storing material containing the nucleating agent (naphthol), crystallization takes place at about 45° C., releasing the latent heat of coagulation. Thus, in FIG. 5, the temperature of the heat-storing material is kept substantially at the coagulation point 45° C. 10 minutes after the start of cooling.

Full lines show heat release rate, where line $16a$ is directed to the single heat-storing material, and line $16b$ to the heat-storing material containing the nucleating agent. In the case of the single heat-storing material, the heat release rate is abruptly lowered because no release of the latent heat of coagulation takes place in the absence of the nucleating agent, whereas in the case of the heat-storing material containing the nucleating agent (naphthol), crystallization takes place about 10 minutes after the start of cooling, releasing the latent heat of coagulation, and thus the heat release rate is kept substantially constant and higher than that of line $16a$ 10 minutes after the start of cooling.

PREFERRED EMBODIMENTS OF THE INVENTION

EXAMPLE 1

5 Samples, that is, 20 g of sodium thiosulfate pentahydrate of special reagent grade sealed in a glass tube, and those each containing 0.01, 0.1, 1.0 or 10% by weight of naphthalene powder (particle size: 0.1 mm) on the basis of sodium thiosulfate pentahydrate, each sealed in glass tubes, were prepared, and heated at 70° C. to completely melt sodium thiosulfate pentahydrate. Then, the samples were cooled to measure their coagulation points. The melted sample of single sodium thiosulfate pentahydrate coagulated at 25° C.; whereas all other melted samples containing naphthalene coagulated at 45° C.

EXAMPLE 2

Samples of 20 g of the same sodium thiosulfate pentahydrate as used in Example 1, each containing 1% by weight of calcium sulfate ($CaSO_4.\frac{1}{2} H_2O$), sodium chloride (NaCl), potassium chloride (KCl), sodium bormide (NaBr), potassium bromide (KBr), sodium iodide (NaI) or potassium iodide (KI), on the basis of sodium thiosulfate pentahydrate, each sealed in glass tubes as in Example 1, were prepared and heated at 70° C. to completely melt the samples. Then, the samples were cooled to measure their coagulation points. It was found that the melted samples coagulated at 42°-43° C. with the effect upon prevention of supercooling.

EXAMPLE 3

The samples of Example 1 containing naphthalene were heated above the melting point of naphthalene (79° C.) to melt the samples and then cooled to measure the coagulation points. All the samples coagulated at 45° C. Throughout 10 repetitions of melting and coagulation, all the samples melted at 45° C. with good reproducibility.

EXAMPLE 4

Samples of sodium thiosulfate pentahydrate containing 0.5% by weight of naphthalene on the basis of sodium thosulfate pentahydrate, each further containing 0.5% by weight of sodium chloride, potassium chloride, sodium bromide, potassium bromide, sodium iodide or potassium iodide, each sealed in glass tubes, were prepared and heated at 70° C. to completely melt the samples, and then cooled to measure their coagulation points. It was found that all of them coagulated at 45° C.

EXAMPLE 5

A sample of sodium thiosulfate pentahydrate containing 1% by weight of naphthalene on the basis of sodium thiosulfate pentahydrate, the naphthalene being deposited on alumina grains, was heated at 70° C. to melt the sample, and then cooled to measure the coagulation point. It was found that the melted sample coagulated at 45° C.

It is obvious from the foregoing Examples that addition of at least 0.01% by weight of naphthalene on the basis of sodium thiosulfate pentahydrate can promote nucleation of sodium thosulfate pentahydrate with a significant effect upon prevention of supercooling.

It is also obvious that sodium sulfate, sodium chloride, potassium chloride, sodium bromide, potassium bromide, sodium iodide, and potassium iodide individually have a nucleating action, and the simultaneous addition thereof with naphthalene produces the similar significant effect.

Naphthalene has a low specific gravity and thus has a high probability of floating, if the heat-storing apparatus is deep. In that case, simultaneous use of calcium sulfate, potassium chloride, sodium chloride, potassium bromide, potassium iodide, sodium iodide, etc. is effective. It is also effective to add naphthalene supported on an appropriate carrier to the heat-storing material, as shown in Example 5, because the apparent specific gravity is increased and the effect of naphthalene is increased thereby.

EXAMPLE 6

Melting points of single sodium thiosulfate pentahydrate and those containing allyl alcohol, ethyl alcohol or pyridine were measured. The results are shown in the following Table.

TABLE

| Heat-storing material | (part by weight) | Anti-super-cooling agent | (part of weight) | Degree of super cooling (°C.) |
|---|---|---|---|---|
| $Na_2S_2O_3.5H_2O$ | 100 | None | 1.0 | 25 |
| " | 100 | allyl alcohol | 1.0 | 2 |
| " | 100 | ethyl alcohol | 1.0 | 8 |
| " | 100 | pyridine | 1.0 | 6 |

When single sodium thiosulfate pentahydrate was cooled from the molten state, it was supercooled by about 25° C.; whereas when the sodium thiosulfate pentahydrate containing any of the alcohols or the pyridine was cooled, they coagulated at about 45° C., whereby the supercooling was prevented.

Some organic compounds, for example, alcohols such as allyl alcohol and ethyl alcohol and pyridine, have a nucleating action upon sodium thiosulfate pentahydrate and thus have an action of preventing the supercooling of sodium thiosulfate pentahydrate.

What is claimed is:

1. A heat-storing composition which comprises sodium thiosulfate pentahydrate and naphthalene as a nucleating agent.

2. The heat-storing composition according to claim 1, wherein the naphthalene is contained in an amount of 0.01-10% by weight on the basis of the sodium thiosulfate pentahydrate.

3. A heat-storing composition which comprises sodium thiosulate pentahydrate, naphthalene and one of calcium sulfate, potassium chloride, sodium chloride, potassium bromide, sodium bromide, potassium iodide, and sodium iodide as nucleating agents.

4. The heat-storing composition according to claim 3, wherein the naphthalene is contained in an amount of 0.01-10% by weight, and one of the calcium sulfate, potassium chloride, sodium chloride, potassium bromide, sodium bromide, potassium iodide, and sodium iodide is contained in an amount of 0.01-10% by weight, on the basis of the sodium thiosulfate pentahydrate.

5. A heat-storing composition, which comprises sodium thiosulfate pentahydrate, naphthalene and at least one of calcium sulfate, potassium chloride, sodium chloride, potassium bromide, sodium bromide, potassium iodide, and sodium iodide.

6. The heat-storing composition according to claim 5, wherein the naphthalene is contained in an amount of 0.01-10% by weight, and at least one of the calcium sulfate, potassium chloride, sodium chloride, potassium bromide, sodium bromide, potassium iodide, and sodium iodide are contained in an amount of 0.01-10% by weight, on the basis of the sodium thiosulfate pentahydrate.

7. A heat-storing composition which comprises sodium thiosulfate pentahydrate and naphthol as a nucleating agent.

8. The heat-storing composition according to claim 7, wherein the naphthol is contained in an amount of 0.01-10% by weight on the basis of the sodium thiosulfate pentahydrate.

9. A heat-storing composition which comprises sodium thiosulfate pentahydrate and pyridine.

10. The heat-storing composition according to claim 9, wherein the pyridine is contained in an amount of 1-10% by weight, on the basis of the sodium thiosulfate pentahydrate.

* * * * *